Jan. 12, 1965   J. DURST   3,165,026
PHOTOGRAPHIC ENLARGER
Filed July 24, 1962   2 Sheets-Sheet 1
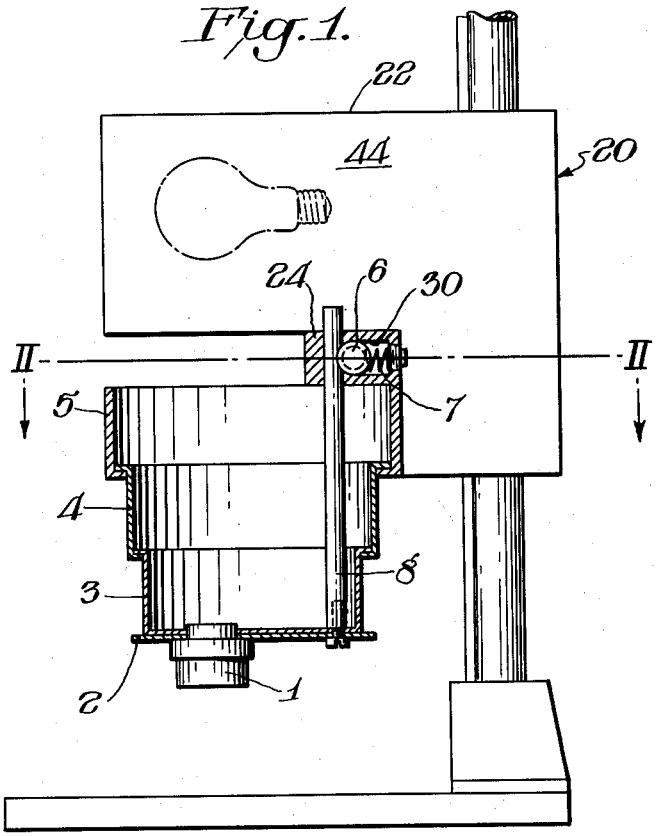
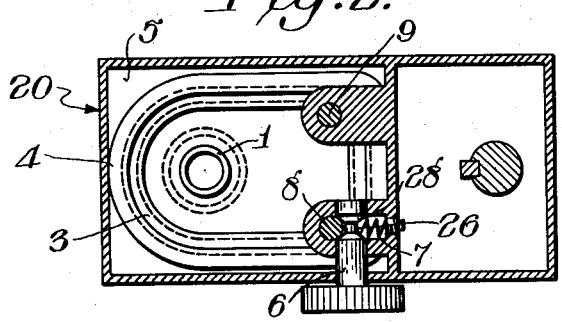
INVENTOR
Julius Durst
BY Connolly and Hutz
ATTORNEYS Jan. 12, 1965   J. DURST   3,165,026
PHOTOGRAPHIC ENLARGER
Filed July 24, 1962   2 Sheets-Sheet 2
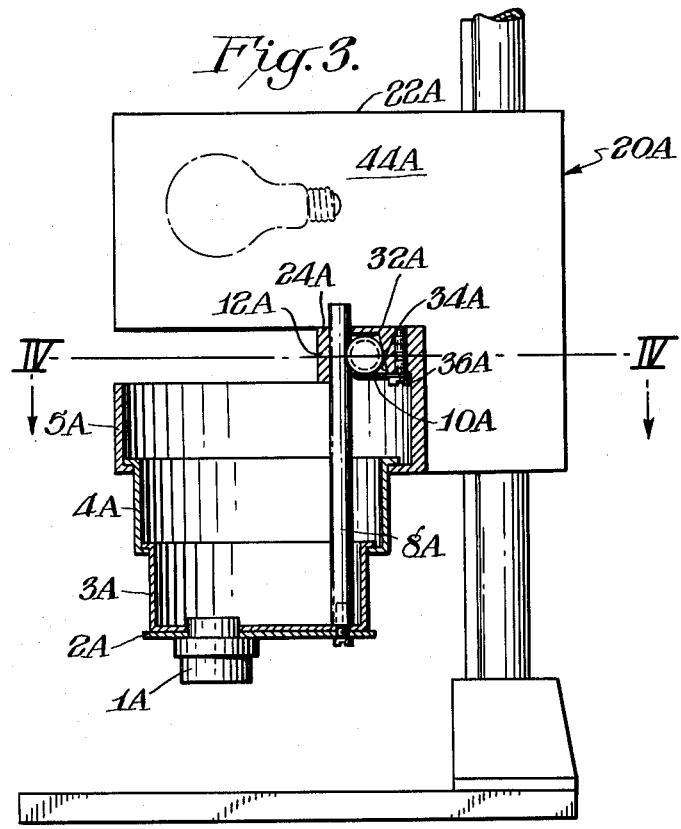
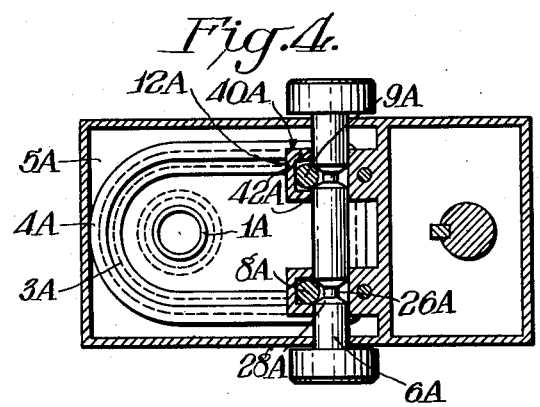
INVENTOR
Julius Durst
BY Connolly and Hutz
ATTORNEYS

United States Patent Office 3,165,026
Patented Jan. 12, 1965

3,165,026
PHOTOGRAPHIC ENLARGER
Julius Durst, Brixen, Bozen, Italy, assignor to Durst A.G. Fabrik Fototechnischer Apparate, Bolzano-Bozen, Italy
Filed July 24, 1962, Ser. No. 212,046
Claims priority, application Italy Nov. 21, 1961
8 Claims. (Cl. 88—24)

This invention relates to a photographic enlarger of the type in which the distance between an objective lens carrier and a negative carrier is varied for focusing, and it more particularly relates to such an enlarger in which an expandable light-tight enclosure extends between the negative carrier and the objective lens carrier.

The negative and objective carriers of photographic enlargers are usually connected to each other by extendable rods to permit the distance between them to be varied for focusing the image sharply upon the easel. These extendable rods are moved longitudinally parallel to the optical axis of the enlarger by frictional or a geared drive, whose accuracy and precision are easily impaired by any acumulation of atmospheric contamination such as dust and moisture.

An object of this invention is to provide a simple and economical means for protecting the focusing drive for a photographic enlarger from atmospheric contamination.

In accordance with this invention the extendable rods connecting the objective lens carrier to a portion of the lamp housing for movement toward and away from the negative carrier are enclosed within the expandable light-tight enclosure between the carriers thereby completely protecting them from contamination from the atmosphere. The path of movement of these rods may also extend within the lamp chamber of the lamp housing. In a frictional drive for such an enlarger efficient engagement of the frictional roller with the rod that it drives may be obtained by resiliently urging the roller into a trough having a wall inclined toward the rod, and a convenient spring for that purpose may be a simple leaf spring mounted across the opening of the trough. Particularly efficient and precise adjustment of such a frictional drive may be accomplished by utilizing a frictional roller having a pair of grooved areas resiliently engaging a pair of extendable rods with one of the engaging springs being weaker than the other to permit one to slip relative to the other thereby facilitating the maintenance of longitudinal synchronism between them. One of the rods is also advantageously supported in a loose bearing which allows it to adjust its distance from the other thereby maintaining both rods firmly engaged with both grooved areas upon the frictional driving roller.

Novel features and advantages of the present invention will become apparent to one skilled in the art from a reading of the following description in conjunction with the accompanying drawings wherein similar reference characters refer to similar parts and in which:

FIG. I is a schematic side view in elevation of one embodiment of this invention partially broken away in cross section;

FIG. II is a cross-sectional view taken through FIG. I along the line II—II;

FIG. III is a schematic side view in elevation partially broken away in cross section of another embodiment of this invention; and FIG. IV is a cross-sectional view taken through FIG. III along the line IV—IV.

The figures of the drawing only very generally illustrate features which do not essentially pertain to this invention, such as the easel, column and lamp housing.

In FIGS. I and II is shown a photographic enlarger 20 including an objective lens 1 mounted upon a flange or plate 2 which is secured to the bottom of objective lens carrier 3. Extendable driving rod 8 and auxiliary extendable guiding rod 9 are secured to objective lens carrier 3. Extendable driving rod 8 is movably connected to negative carrier 5 which is mounted upon a lower portion of lamp housing 22 by retention within a bearing 24. Frictional driving roller 6 incorporates a circumferential grooved area 26 having inwardly tapered or inclined walls 28 which engage the smooth sides of extendable rod 8. Compression spring 7 reacts between bearing 24 and friction roller 6 for maintaining inclined walls 28 of grooved area 26 in firm engagement with the smooth sides of extendable rod 8 to provide the frictional engagement required to longitudinally drive rod 8 in response to rotation of roller 6. As shown in FIG. I, roller 6 engages the side of extendable rod 8 through a slot 30 in bearing 24.

Rotation of sharp focusing roller 6 in the clockwise direction by means of the illustrated knob accordingly moves extendable rod 8 and objective carrier 3 to which it is connected upwardly. Flange 2 upon upward movement engages the lower lip of telescopic element 4 for moving it up within negative carrier 5. Extendable rod 8 and also auxiliary extendable rod 9 are accordingly enclosed within the expandable light-tight enclosure or bellows formed by telescopic elements 3, 4 and 5, and thereby the rods and the drive for moving them longitudinally are completely protected from any atmospheric contamination such as dust or grease or moisture which might adversely affect the efficiency and preciseness of the sharp focusing drive mechanism.

In FIGS. III and IV is shown another enlarger 20A, which is an embodiment of this invention. Enlarger 20A incorporates a frictional drive roller 6A engaging both extendable rods 8A and 9A. It accordingly incorporates a pair of grooved areas 26A having tapered walls 28A which engage the smooth sides of extendable rods 8A and 9A for moving them upwardly and downwardly.

FIG. III shows another mode of maintaining frictional roller 6A in frictional engagement with rods 8A and 9A consisting of the disposition of roller 6A within a trough 32A having a wall 34A inclined toward rod 8A. A spring 10A having a line of action disposed substantially parallel to rod 8A reacts against negative carrier 5A in a direction to force roller 6A into trough 32A against inclined wall 34A thereby maintaining its firm resilient engagement with the smooth side of extendable rod 8A. Spring 10A advantageously consists of a leaf spring connected by screw 36A to an extended portion of bearing block 24A. The portion of frictional drive roller 6A engaged with extendable rod 9A is maintained in resilient engagement with it in a similar manner. However a weaker spring (not shown) is utilized in conjunction with rod 9A to permit it to slip easier than spring 10A for rod 8A thereby preserving longitudinal alignment between the extendable rods throughout their path of longitudinal motion.

For permitting the distance between rods 8A and 9A to freely adjust to maintain them both in firm engagement with corresponding grooves 26A in frictional roller 6A, rod 9A is restrained in only one direction the one perpendicular to the axis of frictional roller 6A. It is thus free to adjust in a direction parallel to the longitudinal axis of roller 6A. This freedom in one direction is provided by confining roller 9A within a loose bearing provided by guide channel 40A having an elongated base 12A between a pair of legs 42A, with the distance along base 12A between legs 42A being wider than rod 9A to permit it to adjust laterally with respect to extendable rod 8A. Rod 8A may therefore be completely confined within a circumferential bearing.

The frictional drives upon the smooth sides of rods 8, 8A, 9 and 9A are maintained completely free of dust and contamination by enclosing them within the light-tight enclosure or bellows of the enlarger. In addition the upper ends of these rods may pass within the lamp chamber 44 of lamp housing 22 to protect them from atmospheric contamination during all phases of operation. This remarkably complete and economical protection for rods 8 and 9 and the frictional drives engaged with them maintains the sharp focusing mechanism in perfect operating condition free of dust and contamination thereby preserving its precision of operation throughout the entire life of the enlarger.

What is claimed is:

1. A photographic enlarger comprising a lamp housing, a lamp chamber in said housing, a negative carrier mounted upon an end of said housing remote from said chamber, an objective lens, and objective lens carrier, an expandable light-tight enclosure between said negative carrier and said objective lens, bearing means between said lamp chamber and said light-tight enclosure and being sealed therebetween, extendable rods connected to the portion of said light-tight enclosure remote from said lamp chamber, said extendable rods projecting through said bearing means and having a path of movement which extends into said lamp chamber, said extendable rods being enclosed within said light-tight enclosure and said lamp chamber thereby protecting them from dust and contamination, and manually accessible drive means in said bearing means engaging portions of said extendable rods for moving said objective lens toward and away from said negative carrier.

2. An enlarger as set forth in claim 1 wherein said expandable light-tight enclosure is a bellows.

3. An enlarger as set forth in claim 2 wherein said bellows is formed by a number of telescopic sections.

4. An enlarger as set forth in claim 1 wherein said drive means comprises a frictional driving roller, said bearing means including a trough having an inclined wall extending toward one of said extendable rods, said frictional driving roller being mounted within said trough, and a spring having a line of action disposed substantially parallel to said rods reacting against said roller in a direction acting to force it into said trough against said inclined wall thereby maintaining it firmly engaged with said extendable rod.

5. An enlarger as set forth in claim 4 wherein said spring is a leaf spring mounted across a wider portion of said trough and against the adjacent surface of said roller.

6. An enlarger as set forth in claim 1 wherein said drive means comprises a frictional roller, said frictional roller including grooved areas engaging each of said extendable rods, said bearing means restraining one of said extendable rods in two directions about its circumference and loosely restraining the other of said rods only in a direction substantially perpendicular to the line of action of the engagement of said frictional roller to permit the distance between said rods to conform to the distance between said grooved areas.

7. An enlarger as set forth in claim 6 wherein said bearing means includes a circumferential bearing for restraining said one rod in said two directions, and a guide channel for restraining said other rod, said guide channel having a pair of legs and an elongated base, and the distance along said base between said legs being wider than said rod to permit it to adjust laterally with respect to said other extendable rod.

8. An enlarger as set forth in claim 1 wherein said drive means comprises a frictional roller, said frictional roller including grooved areas engaging each of said extendable rods, a spring maintaining each of said grooved areas in driving contact with said extendable rods, and one of said springs being stronger than the other to permit one of said frictional areas to slip relative to its rod easier than the other thereby maintaining said rods longitudinally aligned with respect to each other.

References Cited in the file of this patent

UNITED STATES PATENTS

| 1,594,009 | Garbutt et al. | July 27, 1926 |
| 2,003,190 | Hineline | May 28, 1935 |
| 2,344,558 | Moore | Mar. 21, 1944 |
| 2,469,685 | Eagel | May 10, 1949 |
| 2,797,615 | Coleman | July 2, 1957 |

FOREIGN PATENTS

| 141,061 | Australia | Jan. 19, 1950 |